United States Patent
Sung et al.

(10) Patent No.: US 7,526,028 B2
(45) Date of Patent: Apr. 28, 2009

(54) MOTION ESTIMATION METHOD AND APPARATUS FOR VIDEO DATA COMPRESSION

(75) Inventors: Chih-Ta Star Sung, Glonn (DE); Yen-Chieh Ouyang, Taichung (TW)

(73) Assignee: Taiwan Imaging-Tek Corp., Juhdong, HsinChu County (TW)

(*) Notice: Subject to any disclaimer, the term of this patent is extended or adjusted under 35 U.S.C. 154(b) by 44 days.

(21) Appl. No.: 10/626,917

(22) Filed: Jul. 25, 2003

(65) Prior Publication Data
US 2005/0018772 A1    Jan. 27, 2005

(51) Int. Cl.
*H04B 1/66* (2006.01)

(52) U.S. Cl. .............. 375/240.16; 375/240.12; 375/240.24; 375/240.14; 375/240.15; 348/699; 382/236; 382/238

(58) Field of Classification Search ............ 375/240.16, 375/240.12, 240.24, 240.14, 240.15; 348/699; 382/236, 238
See application file for complete search history.

(56) References Cited

U.S. PATENT DOCUMENTS

| | | | |
|---|---|---|---|
| 5,757,668 A * | 5/1998 | Zhu | 375/240.16 |
| 6,269,174 B1 * | 7/2001 | Koba et al. | 382/107 |
| 6,829,373 B2 * | 12/2004 | Piccinelli et al. | 382/107 |
| 2004/0081361 A1 * | 4/2004 | Chen et al. | 382/236 |

* cited by examiner

Primary Examiner—Shawn S. An

(57) ABSTRACT

This invention provides efficient method and apparatus of the motion estimation for the video compression. A storage device saving MVs of a partial or an entire frame and the prediction modes are applied to be the reference for the motion estimation of the neighboring frame. The majority MV of the current frame and at least one neighboring frame is referred as the MV or as the initial point of searching for the current frame or the neighboring frames. Should the movement of the blocks in previous frame is different from the FMV, will the blocks or the neighboring blocks need to go through the motion estimation. The predetermined threshold values are specified to decide the need of a refiner pixel resolution, the sub-sampling ratio, and early giving up or early selecting of the current macroblock. Sub-sampling ratio or the decision of refiner or coarser pixel resolution is determined by the values of the MV or MAD.

3 Claims, 9 Drawing Sheets

The efficient video compression procedure

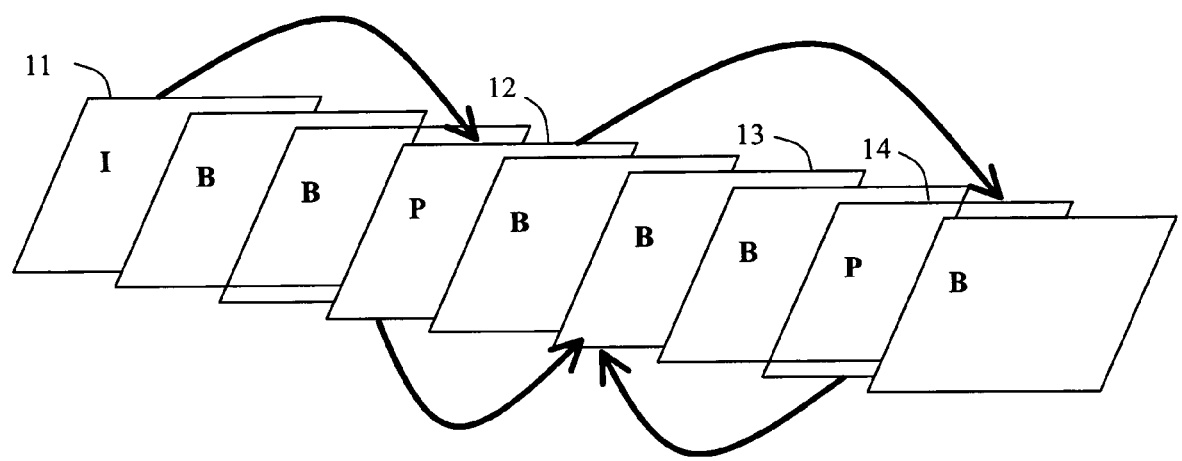
Fig. 1 MPEG picture frame coding types

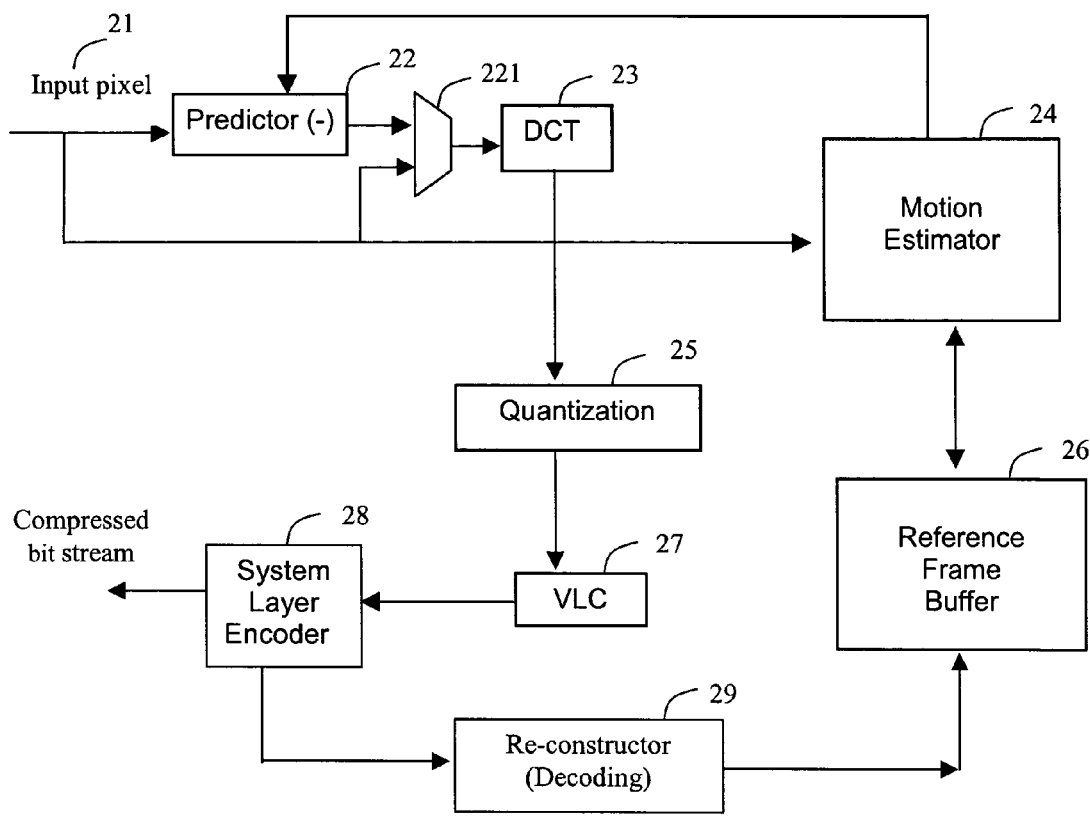
Fig. 2 Block diagram of the video compression

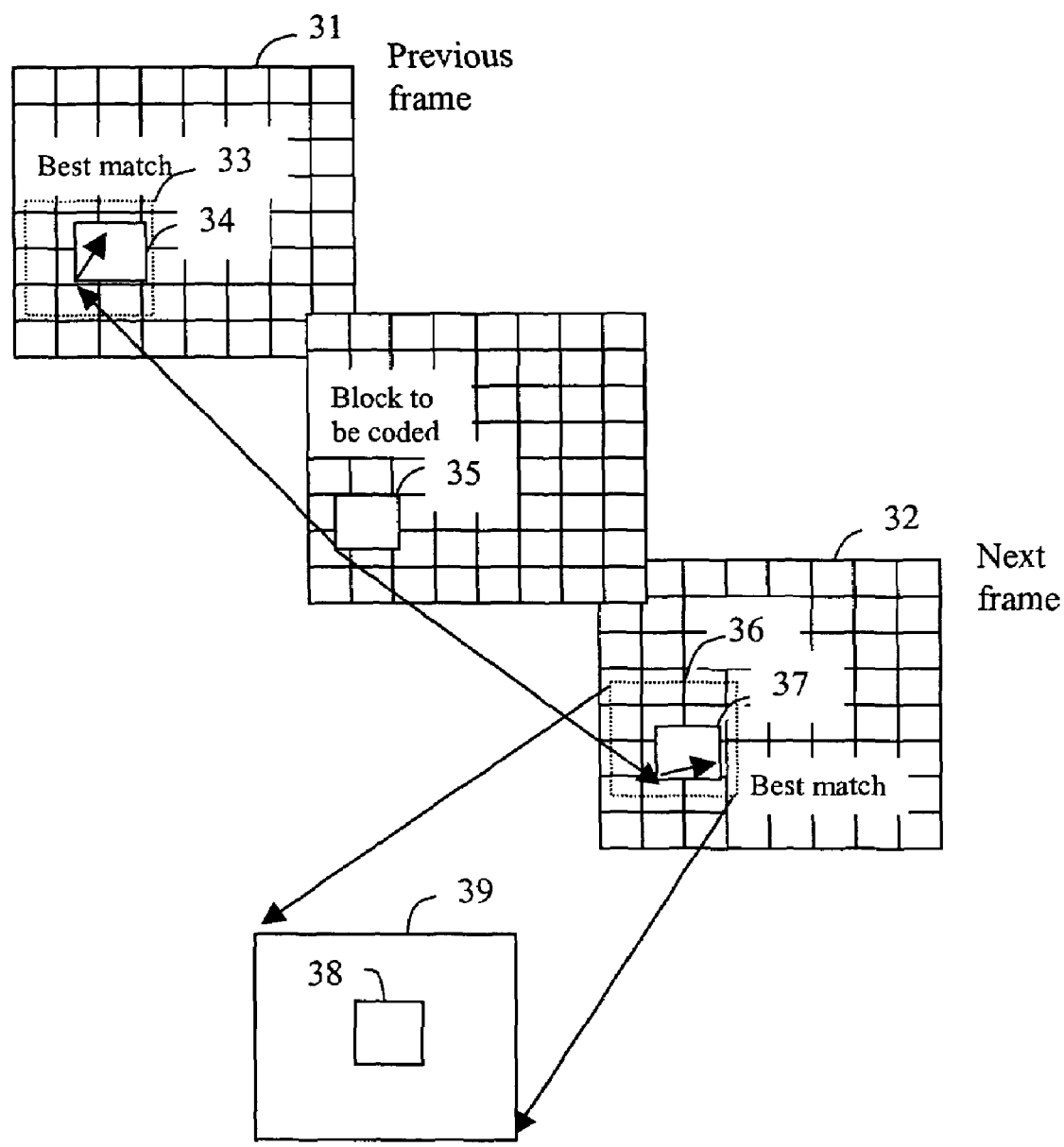
Fig. 3 Best match block searching

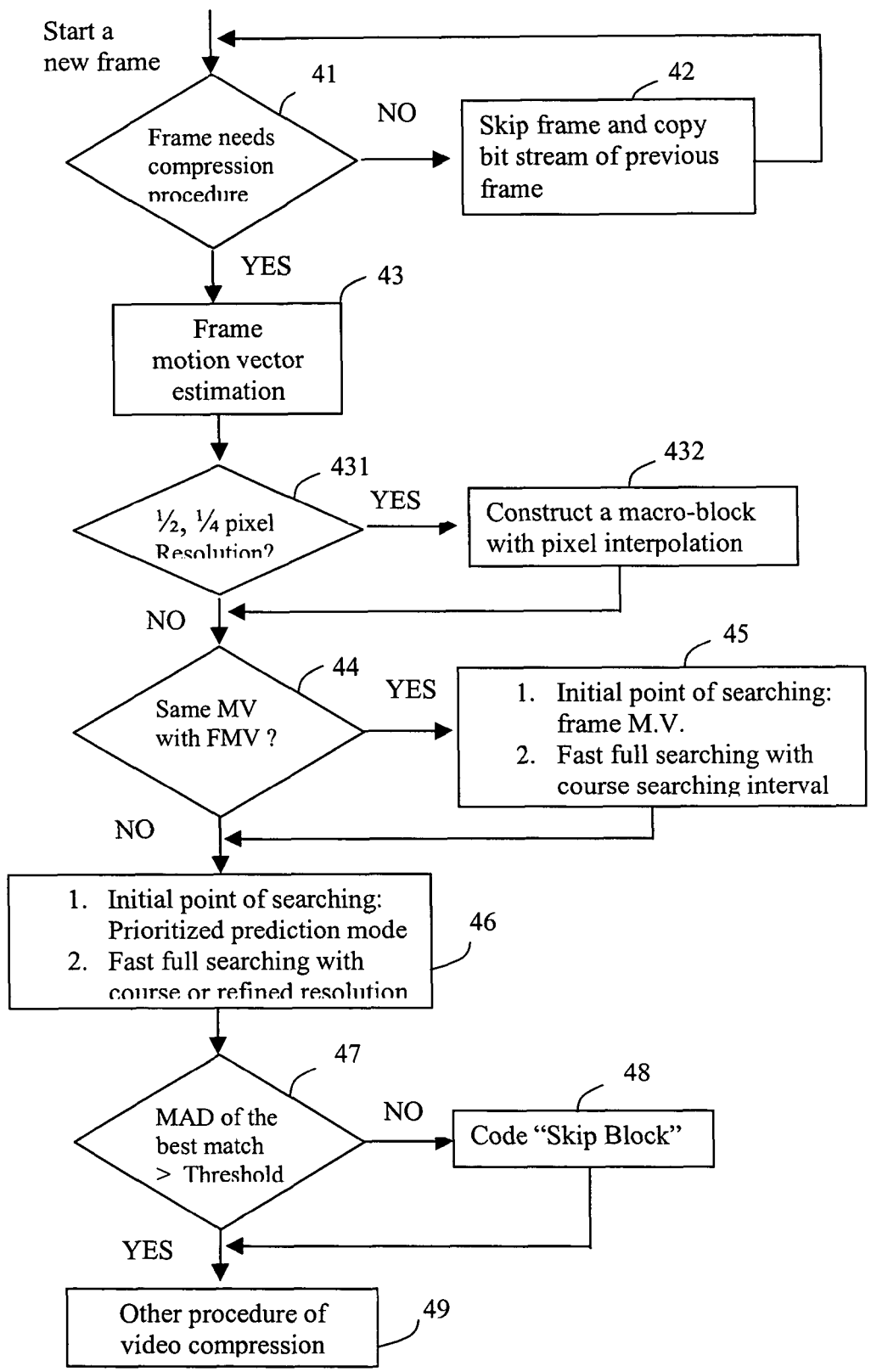
Fig. 4 The efficient video compression procedure

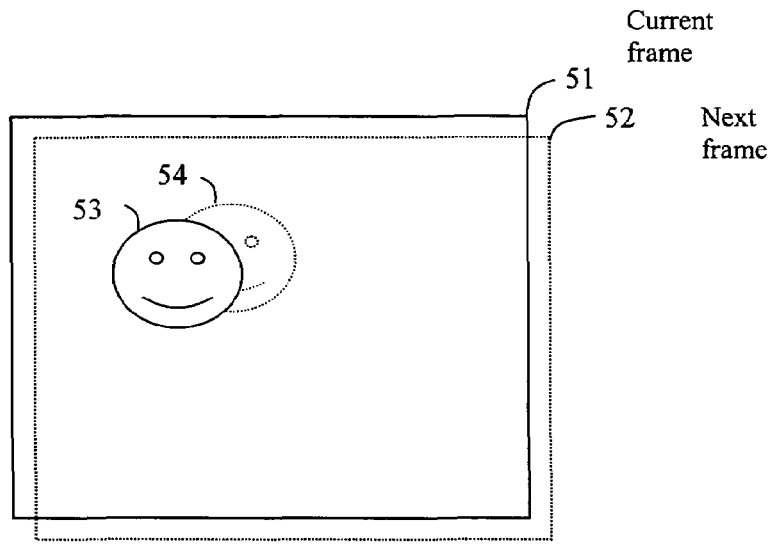
5A. Example of frame movement
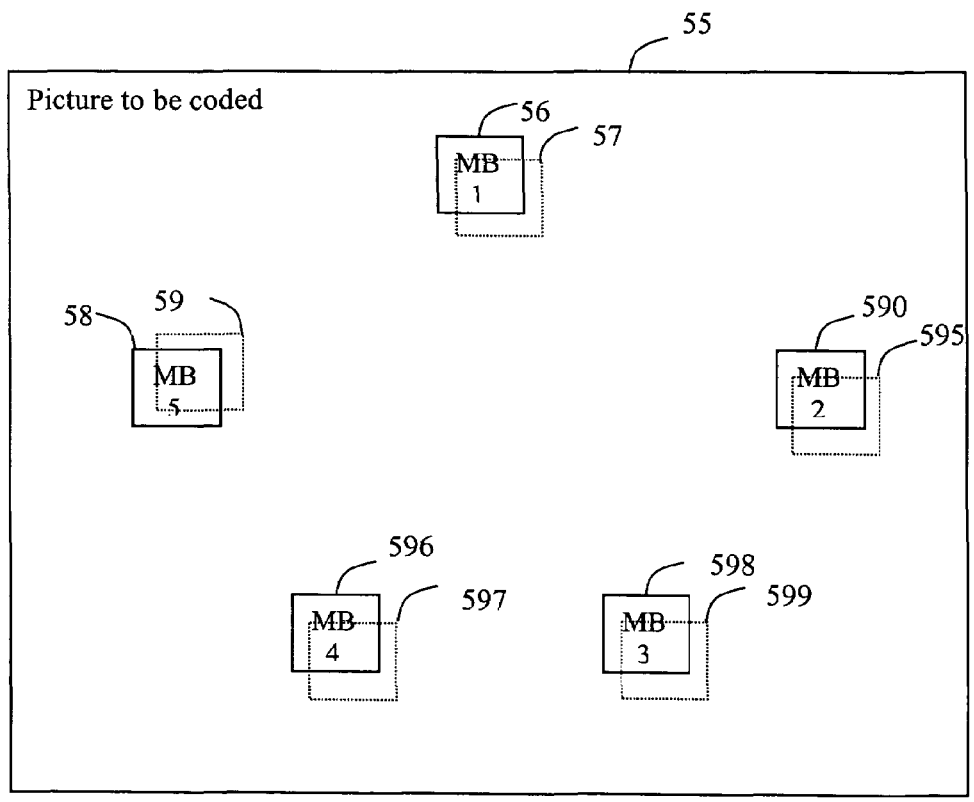
5B. Majority MV determines the FMV
Fig. 5 Frame movement estimation

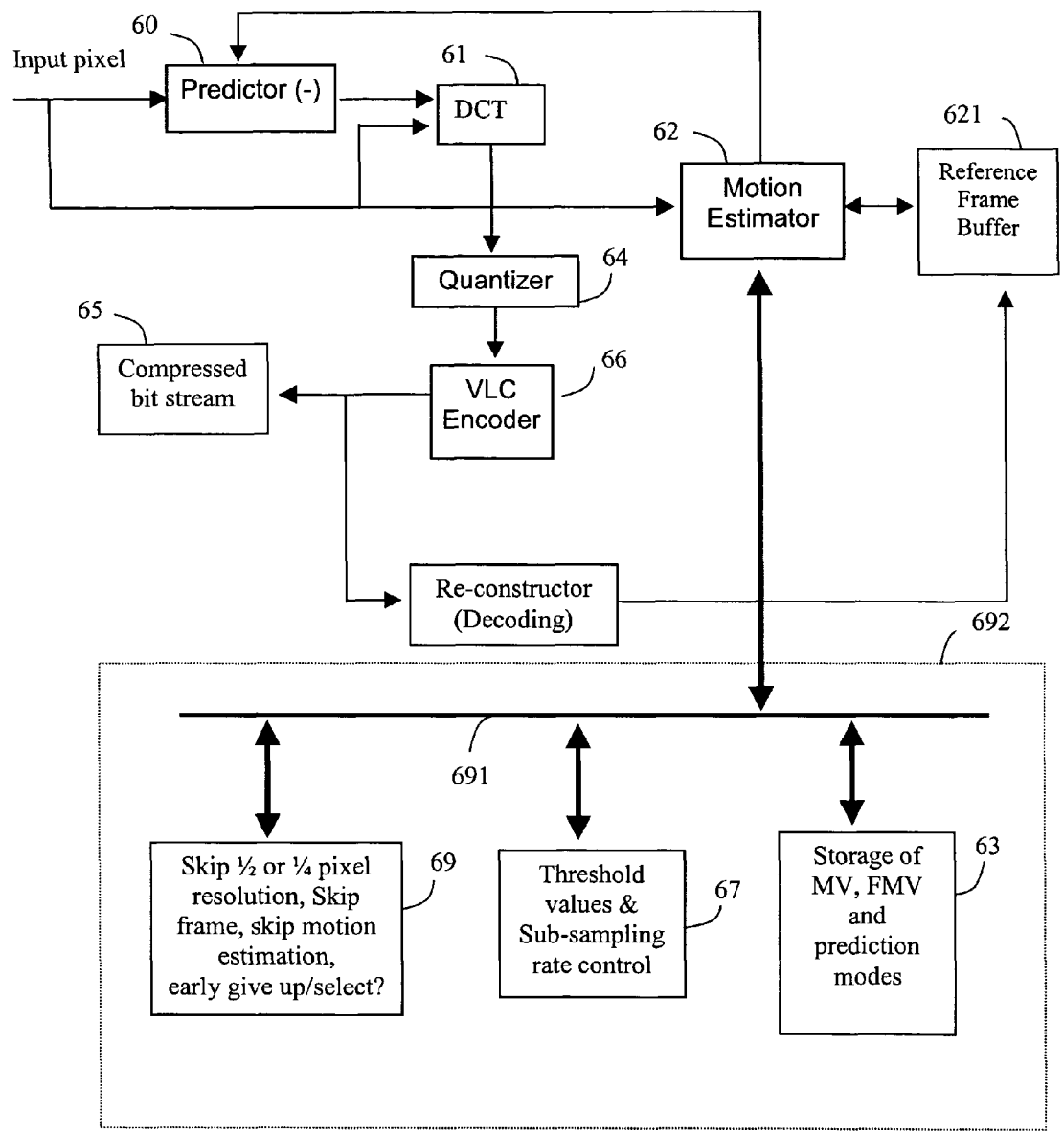
Fig.6 Block diagram of the efficient video compression

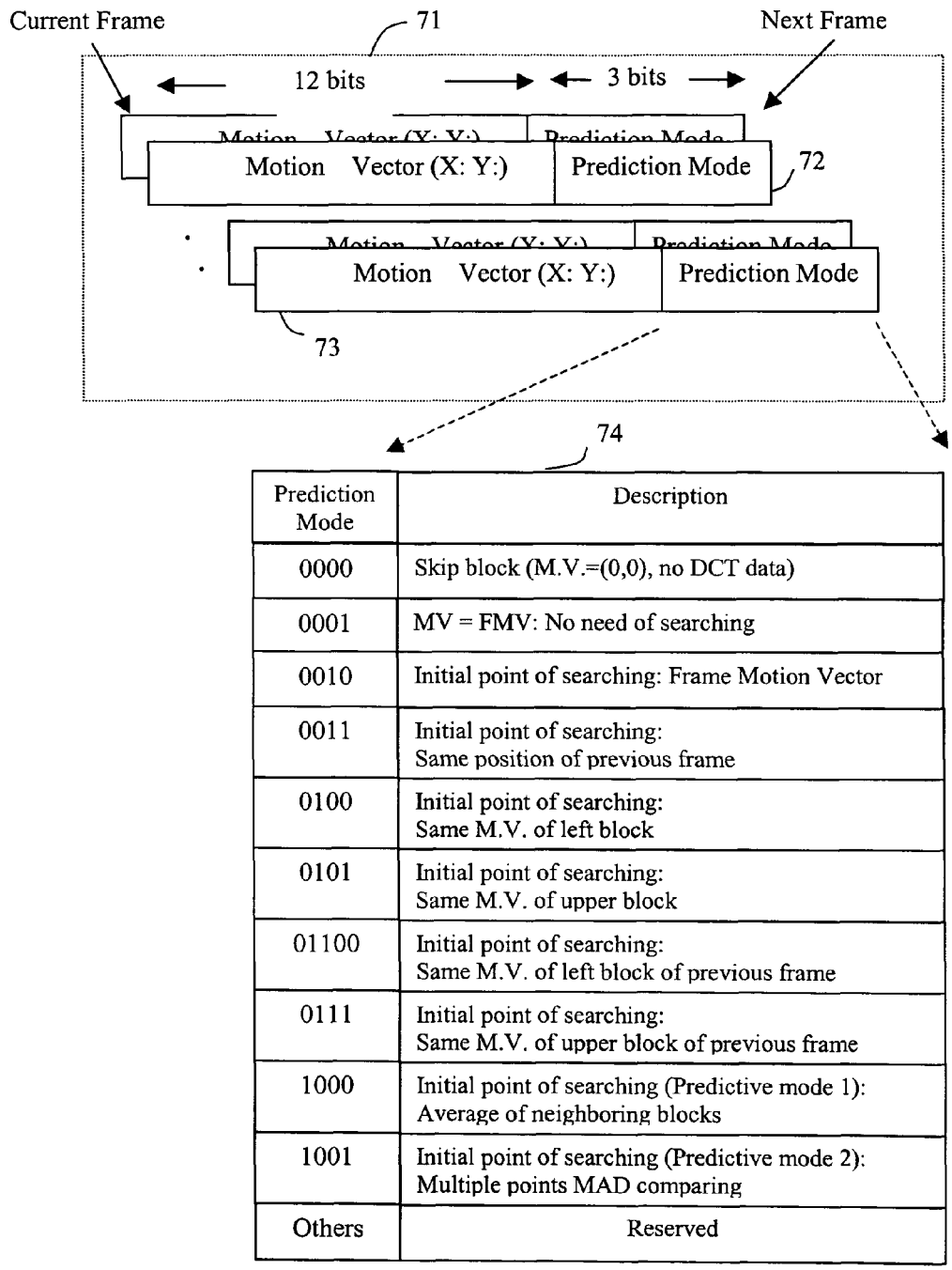
Fig. 7 Format of the motion vector and next frame's prediction mode

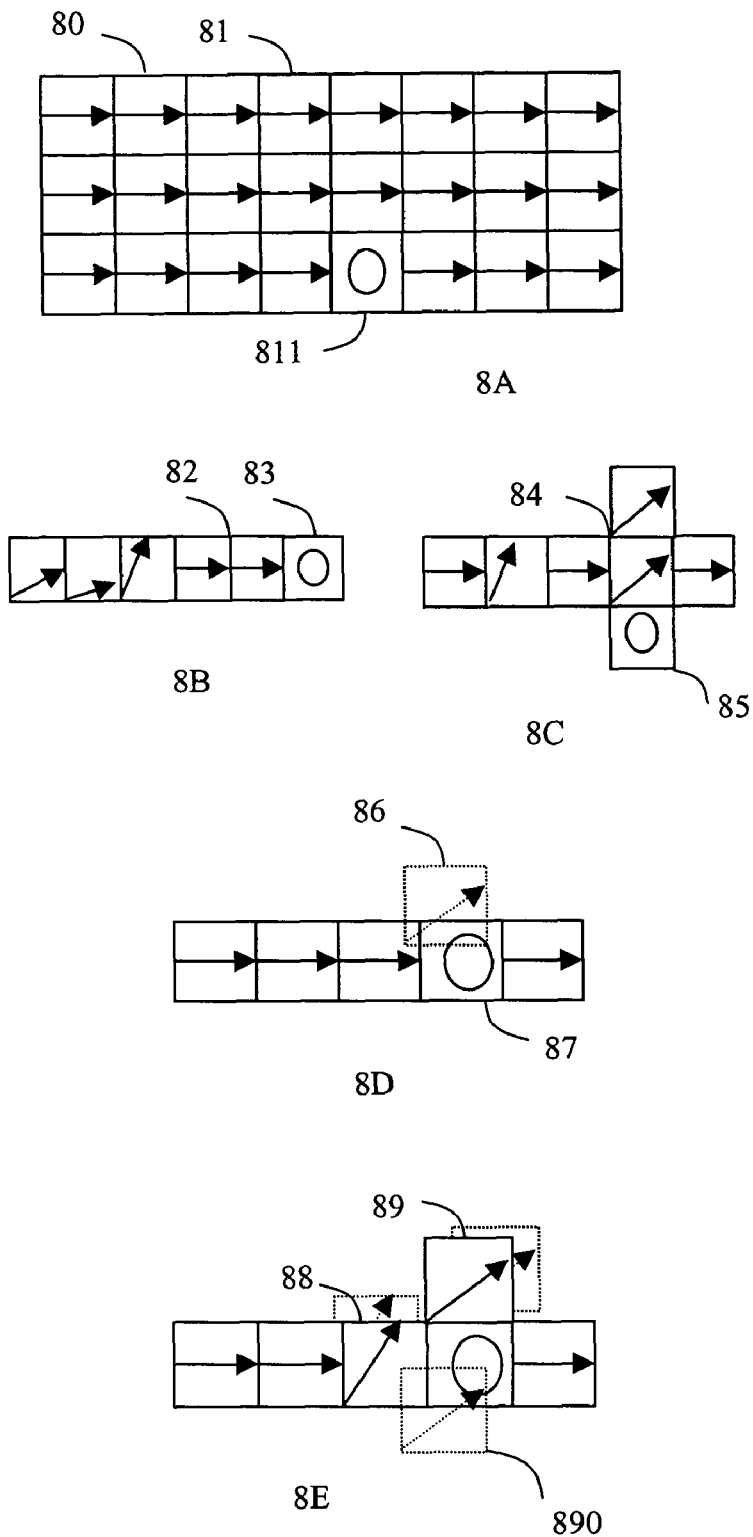
Fig. 8 Motion estimation prediction modes

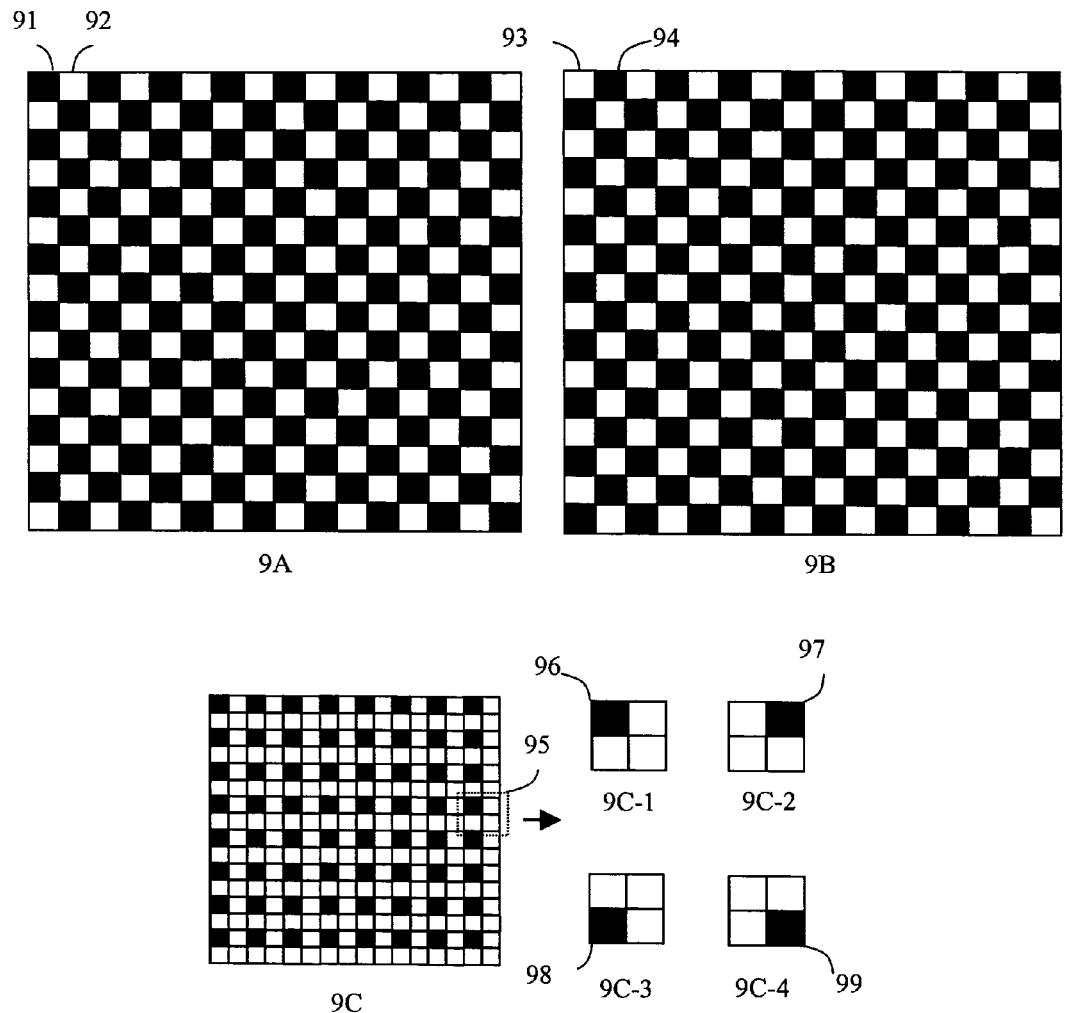
Fig. 9 Sub-sampling with rotating sampling position, 2:1 and 4:1 as examples

MOTION ESTIMATION METHOD AND APPARATUS FOR VIDEO DATA COMPRESSION

BACKGROUND OF THE INVENTION

1. Field of Invention

The present invention is related to digital video compression, and more specifically, to the efficient motion estimation method that results in the saving of computing times.

2. Description of Related Art

Digital video has been adopted in an increasing number of applications, which include video telephony, videoconferencing, surveillance system, VCD (Video CD), DVD, and digital TV. In the past almost two decades, ISO and ITU have separately or jointly developed and defined some digital video compression standards including MPEG-1, MPEG-2, MPEG-4, MPEG-7, H.261, H.263 and H.264. The success of development of the video compression standards fuels the wide applications. The advantage of image and video compression techniques significantly saves the storage space and transmission time without sacrificing much of the image quality.

Most ISO and ITU motion video compression standards adopt Y, Cb and Cr as the pixel elements, which are derived from the original R (Red), G (Green), and B (Blue) color components. The Y stands for the degree of "Luminance", while the Cb and Cr represent the color difference been separated from the "Luminance". In both still and motion picture compression algorithms, the 8×8 pixels "Block" based Y, Cb and Cr go through the similar compression procedure individually.

There are essentially three types of picture codings in the MPEG video compression standard as shown in FIG. 1. I-frame 11, the "Intra-coded" picture, uses the block of 8×8 pixels within the frame to code itself. P-frame 12, the "Predictive" frame, uses previous I-frame or P-frame as a reference to code the differences between frames. B-frame 13, the "Bi-directional" interpolated frame, uses previous I-frame or P-frame 12 as well as the next I-frame or P-frame 14 as references to code the pixel information. In the I-frame coding, all "Block" with 8×8 pixels go through the same compression procedure that is similar to JPEG, the still image compression algorithm. At the same time, the P-frame and B-frame have to code the differences between the targeted frame and the reference frames.

In the coding of the differences between frames, the first step is to find the difference of the targeted frame, followed by the coding of the difference. For some considerations including accuracy, performance, and coding efficiency, in some video compression standards, a frame is partitioned into macroblocks of 16×16 pixels to estimate the block difference and the block movement. Each macroblock within a frame has to find the "best match" macroblock in the previous frame or in the next frame. The mechanism of identifying the best match macroblock is called "Motion Estimation". A searching range is commonly defined to limit the computing times in the "best match" block searching. The computing power hungered motion estimation is adopted to search for the "Best Match" candidates within a searching range for each macro block as described in FIG. 3. According to the MPEG standard, a macro block is composed of four 8×8 "blocks" of "Luma (Y)" and one, two, or four "Chroma (Cb and Cr)". Since Luma and Chroma are closely associated, in the motion estimation, only Luma needs the mostion estimation, and the Chroma, Cb and Cr in the corresponding position copy the same MV of Luma. The Motion Vector, MV, represents the direction and displacement of the block movement. For example, an MV=(5, −3) stands for the block movement of 5 pixels right in X-axis and 3 pixel down in the Y-axis. Motion estimator searches for the best match macroblock within a predetermined searching range 33, 36. By comparing the mean absolute differences, MAD or sum of absolute differences, SAD, the macroblock with the least MAD or SAD is identified as the "best match" macroblock. Once the best match blocks are identified, the MV between the targeted block 35 and the best match blocks 34, 37 can be calculated and the differences between each block within a macro block can be coded accordingly. This kind of block difference coding technique is called "Motion Compensation". In the procedure of the motion estimation and motion compensation, the higher accuracy of the best match block, the less bit number will be needed in the coding since the block difference can be smaller if the accuracy is higher.

FIG. 2 shows a prior art block diagram of the MPEG video compression, which is most commonly adopted by video compression IC and system suppliers. In the case of I-frame or I-type macro block coding, the MUX 221 selects the coming pixels 21 to directly go to the DCT 23 block, the Discrete Cosine Transform before the Quantization 25 step. The quantized DCT coefficients are packed as pairs of "Run-Length" code, which has patterns that will later be counted and be assigned code with variable length by the VLC encoder 27. The Variable Length Coding depends on the pattern occurrence. The compressed I-frame bit stream will then be reconstructed by the reverse route of compression procedure 29 and be stored in a reference frame buffer 26 as future frames' reference. In the case of a P-frame, B-frame or a P-type, or a B-type macro block coding, the macro block pixels are sent to the motion estimator 24 to compare with pixels within macroblock of previous frame for the searching of the best match macroblock. The Predictor 22 calculates the pixel differences between the targeted 8×8 block and the block within the best match macroblock of previous frame or next frame if B-type frame. The block difference is then fed into the DCT 23, quantization 25, and VLC 27 coding, which is the same procedure like the I-frame or I-type macroblock coding.

Since the motion estimation consumes most computing power in the video compression procedure, the speed up of the motion estimation benefits in the total video compression performance enhancement. Bad or inaccurate measurement of the motion vector, the MV, results in larger differences between the targeted macroblock and the so called "best match" macroblock to cause higher bit rate of the compressed bit stream. A higher bit rate causes longer time in transmitting the data and requires more storage device to save the data. A commonly used method of reducing the bit rate is to quantize the DCT coefficients by using coarser quantization scales, which will more or less degrade the image quality and trigger more artifacts. Therefore, the compression performance, image quality and bit rate, are mostly likely conflicting requirements in video compression and becomes tradeoffs in the video compression system design.

SUMMARY OF THE INVENTION

Most motion estimation algorithms require about 50%-60% of the total computing power of the video stream encoding. The present invention is related to a method and apparatus of the motion estimation, which plays an important role in digital video compression, specifically in encoding the MPEG video stream. The present invention of the method of the efficient motion estimation significantly reduces the computing times compared to its counterparts.

The present invention of the efficient motion estimation includes procedures and steps of quickly screening the pixel data within a frame, a GOB (group of blocks), and a macroblock to determine whether the plurality of a frame, a GOB, or a macroblock need to go through the steps of motion estimation or not.

The present invention identifies the MV of the plurality of macroblocks in a frame, so named the "Frame Motion Vector", the FMV, and applies this FMV to be the MV for the plurality of macroblocks in a frame that needs no motion estimation.

This method is also applied the FMV to be the initial point of the motion estimation for the plurality of macroblocks in a frame that needs to go through the procedure of motion estimation.

The present invention of the motion estimation identifies the best match macroblock of a macroblock and applies the best match macroblock to its neighboring macroblocks or to a Group Of Blocks, a GOB.

The present invention quickly identifies the most probable initial point of searching for a plurality of macroblocks and prioritizes the initial points of searching including some prediction modes of the best match macroblock searching.

The present invention of the motion estimation applies the FMV, the MV of the neighboring macroblocks to be the references of prediction of the initial point of the motion estimation.

The present invention applies multiple points of MAD calculation of neighboring blocks within the current frame and previous frame and adopts the position with the lowest MAD as the initial point for the best match macroblock searching.

The present invention applies the method of the multiple points prediction to the macroblocks with the corresponding MV of previous frame larger than a predetermined value.

The present invention of the motion estimation quickly determines whether a refiner pixel, said a ½, or ¼, pixel resolution, is needed by comparing the MAD (or SAD) to the predetermined "Adaptive Threshold Values". If the MAD (or SAD) is lower than the predetermined threshold value, then the refiner, said ½, or ¼, pixel resolution is waived, which results in a saving of four times or 16 times of computing in the motion estimation.

The present invention of the motion estimation also encompasses a method of best match searching for those macroblocks, which previously have movement that is not the same with the frame movement and their neighboring macroblocks. When the number of macroblocks with motion different from the frame motion reaches a pre-determined value, the engine resumes motion estimation for all macroblocks within a frame.

The present invention of the motion estimation also encompasses a method for motion estimation by using the pre-determined "Adaptive Threshold Values" to decide the best match macroblock under variable region within a frame.

The present invention of the motion estimation also encompasses a method of the efficient motion estimation by a modified sub-sampling means with the adaptive sub-sampling ratio and the variable sample pixel selection position, which results in significant reduction of calculation times without sacrificing much of the accuracy.

When applied to the full search stage, the method stops the calculation of MAD and gives up the current macroblock in the case of any single pixel difference being larger than a predetermined threshold.

When applied to full search stage, the method stops the calculation of further MAD and selects the current macroblock as the "best match" macroblock in the case of the current MAD is less than a predetermined threshold.

The present invention of the motion estimation uses higher sub-sampling ratio for macroblocks within the region of less movement and uses lower sub-sampling ratio in the region of more movement.

The present invention of the motion estimation uses sub-sampling means in partitioning a frame into variable regions with different degree of movement.

The present invention encompasses a means that identifies block edge and new object with higher MAD, and applies no sub-sampling means in motion estimation 46, and when DCT coefficients go to quantization, the method uses smaller quantization scales.

The present invention of the motion estimation also encompasses a method of determining whether to stop the calculation of the motion estimation before the completion of the whole block difference calculation in the case that any one or more consecutive pixels differences are beyond the adaptively pre-determined threshold values.

In contradictorily to above method, the present invention encompasses a method of the efficient motion estimation by early deciding whether the current macroblock can be identified as the best match macroblock by comparing to the MAD and the corresponding MV of the previous frame.

The method is implemented in a device such as a motion estimation system and module of a digital video encoder that concurrently implements any of the above methods of the present invention in any combination thereof.

It is to be understood that both the foregoing general description and the following detailed description are by examples, and are intended to provide further explanation of the invention as claimed.

BRIEF DESCRIPTION OF THE DRAWINGS

FIG. 1 shows three basic types of the MPEG video frame coding including I-frame, P-frame and B-frame.

FIG. 2 is a brief block diagram of the prior art video compression encoder, which is conventionally used in most MPEG encoder system.

FIG. 3 is an illustration of the best match macroblock searching from the previous frame and the next frame. The concept of the searching range is also depicted in this figure.

FIG. 4 illustrates the efficient video compression procedure, which results in fast motion estimation according to the present invention.

FIG. 5 depicts the concept of frame movement and means of the FMV estimation. 5A shows that the frame is moving in one direction while the object is moving in another direction. 5B demonstrates a means of measuring the frame motion vector, FMV by selecting the majority MV of the multiple macroblocks.

FIG. 6 is the block diagram of the invented motion estimation with the adaptive sub-sampling ratio control, adaptive threshold values control, and the storage of MV and prediction modes.

FIG. 7 depicts the storage device of the MV and the corresponding prediction mode for the next frame of each macroblock. This figure also shows a table listing the code and description of the prediction modes.

FIG. 8 illustrates six different types of the MV predictions including the FMV, neighboring macroblocks, and previous frame's corresponding macroblock and a multiple points searching. Some prediction modes are implicitly included in this figure.

FIG. 9 depicts the concept of pixel selection of the sub-sampling means in the MAD/SAD calculation as well as in calculating the block differences. The periodical interleaving means of the pixel selection is also demonstrated in this figure by 2:1 and 4:1 sub-sampling ratios.

DESCRIPTION OF THE PREFERRED EMBODIMENTS

The present invention is specifically related to the motion estimation. The method and apparatus quickly identifies the best match macroblock, which results in a significant saving of the computing power.

Three types of picture coding in the MPEG video compression standard include I-frame, the "Intra-coded", P-frame, the "Predictive" frame, and B-frame, the "Bi-directional" interpolated frame. I-frame coding 11 uses the 8×8 block of pixels within the frame to code itself. P-frame 12 or P-type macroblock coding uses previous I-frame or P-frame as a reference to code the difference. The B-frame 13 or B-type macroblock coding uses previous I- or P-frame 12 as well as the next I- or P-frame 14 as references to code the pixel information. In most applications, since the I-frame does not use any other frames as reference, there is no need of the motion estimation, the image quality is the best of the three types of pictures, and requires least computing power in coding. Because the motion estimation needs to be done in both previous and next frames, bi-directional coding, coding the B-frame, has lowest bit rate, but consumes most computing power compared to I-frame and P-frame. The lower bit rate of B-frame compared to P-frame and I-frame is contributed by two factors: the averaging distance of a B-frame to either previous or next frame is less than that of the P-frame and the quantization scale is larger than that in a P-frame. Therefore, the encoding of the three MPEG pictures becomes tradeoff among performance, bit rate, and image quality. The resulting ranking of these three factors of three types of picture codings are shown as below:

|          | Performance (Encoding speed) | Bit rate | Image quality |
| -------- | ---------------------------- | -------- | ------------- |
| I-frame  | Fastest                      | Highest  | Best          |
| P-frame  | Middle                       | Middle   | Middle        |
| B-frame  | Slowest                      | Lowest   | Worst         |

FIG. 2 illustrates the block diagram and data flow of the digital video compression procedure, which is commonly adopted by compression standards and system vendors. This video encoding module includes several key functional blocks: the Predictor 22, DCT 23, quantizer 25, VLC encoder 27, motion estimator 24, reference frame buffer 26, and the re-constructor (decoding) 29. The MPEG video compression specifies I-frame, P-frame and B-frame coding. MPEG also allows macroblock as a compression unit to determine which type of the three coding means is for the targeted macroblock. In the case of I-frame or I-type macro block coding, the MUX 221 selects the coming pixels 21 to go to the DCT 23 block, the Discrete Cosine Transform, before the Quantization 25. The quantized DCT coefficients are packed as pairs of "Run-Length" code, which the patterns will be counted and assigned code with variable length by the VLC Encoder 27. Assignment of the variable length coding depends on the probability of pattern occurrence. The compressed I-frame bit stream will then be reconstructed by the re-constructor 29, the reverse route of compression, and be temporarily stored in a reference frame buffer 26 for future frames' reference in the procedure of motion estimation and motion compensation. In the case of a P-frame, B-frame, or a P-type, B-type macro block coding, the macro block pixels are sent to the motion estimator 24 to compare with pixels within a macroblock of previous frames to search for the best match macroblock. Once the best match macroblock is identified, the Predictor 22 calculates the block pixel differences between the targeted 8×8 block and the block within the best match macroblock of previous frame (or next frame in B-type). The block difference is then fed into the DCT 23, quantizer and VLC encoder, as the same procedure in the I-frame or I-type macroblock coding.

The Best Match Algorithm, BMA, is the most commonly used motion estimation algorithm in the popular video compression standards like MPEG and H.26x. In most video compression systems, motion estimation consumes high computing power ranging from ~50% to ~80% of the total computing power for the video compression. In the search for the best match macroblock, a searching range, for example +/−16 pixels in both X- and Y-axis, is most commonly defined. The mean absolute difference, MAD or sum of absolute difference, SAD as shown below, is calculated for each position of a macroblock within the predetermined searching range, for example, a +/−16 pixels of the X-axis $$SAD(x, y) = \sum_{i=0}^{15} \sum_{j=0}^{15} | V_n(x+i, y+j) - V_m(x+dx+i, y+dy+j) |$$

$$MAD(x, y) = \frac{1}{256} \sum_{i=0}^{15} \sum_{j=0}^{15} | V_n(x+i, y+j) - V_m(x+dx+i, y+dy+j) |$$

and Y-axis. In above MAD and SAD equations, the Vn and Vm stand for the 16×16 pixel array, i and j stand for the 16 pixels of the X-axis and Y-axis separately, while the dx and dy are the change of position of the macroblock. The macroblock with the least MAD (or SAD) is from the BMA definition named the "Best match" macroblock. FIG. 3 depicts the best match macroblock searching and the depiction of the searching range. A motion estimator searches for the best match macroblock within a predetermined searching range 33, 36, 39 by comparing the mean absolute difference, MAD, or sum of absolute differences, SAD. The macroblock of a certain of position having the least MAD or SAD is identified as the "best match" macroblock. Once the best match blocks are identified, the MV between the targeted block 35 and the best match blocks 34, 37 can then be calculated and the differences between each block within a macro-block can be coded accordingly This kind of block difference coding technique is called "Motion Compensation". The calculation of the motion estimation consumes most computing power in most video compression systems. Many efforts in the past decades have been put to improve the speed of motion estimation and also in improving the image quality.

FIG. 9 illustrates the means of the pixel sub-sampling and examples of 2:1 and 4:1 sub-sampling ratios. Since sub-sampling does not include all pixels in the motion estimation, some degree of error is expected. For minimizing the error caused by sub-sampling, the present invention uses an optimized sub-sampling means by periodically rotating the selection of pixel from frame to frame within a video sequence. FIG. 9A shows the 2:1 sampling ratio, in this example, the black position 91 represents the selected pixel, the blank position 92 represents the unselected pixel. In the next frame, as shown in 9B, the selected pixel of previous frame 9A becomes unselected pixel 93, while the unselected pixel in 9A becomes a selected pixel 94. In a video sequence of 30 frames per second, which is most commonly supported frame rate, the duration between 2 frames is 30 mili. Seconds, which is short, and the rotation of selecting pixel in a 2:1 sampling ratio ensures that all pixels will be sampled once every 60 mili. seconds. FIG. 9C depicts the 4:1 sampling ratio. Under the 4:1 sampling ratio, the selected pixel of the four pixels is shown in black positions of the 9C1, 9C2, 9C3 and 9C4. Since the sub-sampling ratio is 4:1, the present invention periodically rotates the selecting position 96-97-98-99 from frame to frame in a group of four frames to reduce the error caused by the sub-sampling. The sub-sampling means with optimized selection point is used throughout the complete invention of the motion estimation. Theoretically, the computing speed in the motion estimation is doubled by adopting the 2:1 sub-sampling ratio and becomes 4×faster by 4:1 sub-sampling ratio since the number of calculation of the MAD is proportionally reduced by a factor of 2 in 2:1 sub-sampling ratio and 4 in the 4:1 sub-sampling ratio.

The present invention applies the sub-sampling means for the image quality optimization by rotating the selection point as described above, and quickly identifies the MV of each macroblock within a frame. For avoiding errors, the MVs within a frame or within a region with more movement, lower sub-sampling ratio, said 2:1, or no sub-sampling instead of higher sub-sampling ratio said 4:1 or 8:1 means is applied in the motion estimation. While it is that in a frame or in a region with macroblocks having relatively lower MV values compared to the neighboring macroblocks or corresponding macroblock of previous frame, less movement is expected and a higher sub-sampling ratio, said 4:1 or 8:1 is applied for the motion estimation.

FIG. 4 briefly depicts the video compression procedure of the present invention. A coming frame 41 is compared with previous frame by a coarse of sub-sampling means with a predetermined threshold value to decide whether this frame need to go through the video compression procedure or not. If the coming frame has very high similarity with low MAD, and each sampled pixel has high degree of similarity compared to previous frame, then this frame does not need video compression. For compliant to MPEG standard, a skip frame 42 operation will be used to copy the compressed bit stream of previous frame to represent current frame with a little change of the frame header information. If the coming frame needs normal video compression procedure, then the next step, the operation of the "Frame motion vector, FMV Estimation" 43 gets kicked off. The frame motion vector, FMV, will be saved in a storage device like a register for future macroblock movement prediction use. In present invention, the ½ or ¼ pixel resolution 431 is only applied when necessary, which means that when a MV is larger than the predetermined threshold or a MAD is beyond a predetermined threshold, the ½ or ¼ pixel resolution becomes needed. For example, in the edge of an object, the MAD value of the best match will be significantly larger than those MAD values of macroblocks within an object and a refiner, said ½ pixel or ¼ pixel resolution becomes needed. Since the high similarity of a block and its corresponding block from frame to frame, the targeted macroblock MV of previous frame is compared to the FMV in step 44 to check the similarity to the FMV, said background movement. The frame motion might be caused by intentional movement or unexpected vibration. If the targeted macroblock MV of previous frame is equal to the FMV or the difference is smaller than a predetermined threshold value, then step 45 of motion estimation is applied. In step 45, the FMV will be applied as the initial point of the motion estimation and a full searching will use sub-sampling means with selecting point rotating for optimizing the image quality. Depends on the degree of similarity to the FMV, the sub-sampling ratio will adaptively change to accelerate the speed of full searching. If the targeted macroblock has no high similarity to the FMV, then step 46 of the prioritized prediction modes is applied in the initial point prediction and a refined searching interval is specified in the full searching. A refined searching interval in this invention means a ½ pixel or a ¼ pixel resolution as well as a lower sub-sampling ratio in the sub-sampling alternative. The MAD of the best match macroblock 47 will then be compared with the adaptively predetermined threshold value to decide whether the "Skip Macroblock" 48 in motion compensation can be coded instead of going through the coding of the motion compensation and other video compression procedure 49 like DCT, quantization, and VLC.

In determining whether a coarse or refined resolution is needed in the motion estimation, the present invention applies refined resolution, ½ or ¼ pixel, and lower sub-sampling ratio, 2:1 or 1:1, to the macroblock having movement and its surrounding macroblocks. A ½ or a ¼ pixel resolution of the motion estimation indeed improves the accuracy and hence improves the image quality and reduces the bit rate. Because that constructing a 16×16 macroblock 432 requires quite a lot of computing power, and the higher the resolution the more computing power is expected in motion estimation, in the ½ pixel resolution the computing time is 4× more than in the single pixel resolution, and in the ¼ pixel resolution it shoots to 16× more computing times than using single pixel resolution. When the total number of macroblock having movement is beyond an adaptively predetermined value, motion estimation will resume, and all macroblocks have to go through motion estimation with refined resolution, said ½ or ¼ pixel resolution, and no sub-sampling means. Those macroblock which previously have the same MV as FMV and not adjacent or surrounding to the macroblocks with movement not the same with FMV can just share the same MV with FMV by setting the 4-bit prediction mode code to "0001".

FIG. 5 illustrates the alternative of the frame motion vector estimation. Frame movement can be caused by camera user's intention or by unintentional camera movement including the vibration by external force. FIG. 5A depicts an example of the frame motion. For example, if the current frame 51 moves to the next frame 52 in a motion vector (8,−9). Most macroblocks within a frame move along the same motion vector as the FMV, (8,−9), 8 pixels right, 9 pixels down, while the object 53, or some macroblocks within a GOB move to the next position along different motion vector, ex. Said (5,3) which is different from the FMV. The present invention specifies one means of identifying the FMV as depicted in FIG. 5B. The macroblocks 57, 59, 595, 597 and 599 with dashed square are the best match macroblocks in previous frame. This means of frame motion vector estimation selects several macroblocks, said five, from different region of a frame to avoid potential ambiguity to estimate the MV of the selected macroblocks. The majority with the same MV is identified as the FMV, frame motion vector, and is applied to the macroblock motion estimation throughout a certain period of the video sequence. If the number of the macroblocks with MV different from the FMV gets higher than the adaptively predetermined threshold number, the FMV should be re-estimated to obtain higher accuracy and efficiency in motion estimation. The present invention predetermines the threshold number used to determine whether the FMV re-estimation of is needed depends on the rate of the MV change. Which means the threshold number could be set lower if the increase rate of the MV different from FMV is higher, and could be set higher if the increase rate is high. This method ensures that the more movement within a frame, the more frequent the frame is to be refreshed by re-estimating the FMV. The present invention also optionally re-estimates the FMV every time a new I-frame shows up. Once the FMV is identified, it will be saved to a storage device as the reference in the future motion estimation.

FIG. 7 illustrates the format of the motion vector of current frame and the prediction mode of the corresponding macroblocks in the next frame in present invention of the motion estimation. The long length of bits 73 is the MV of current frame. Another 4 bits are used to specify the prediction mode for identifying the initial point of searching in the next frame motion estimation. In the CIF format, with 352×288 pixels adopted as one of the frame size in MPEG 1, MPEG 2, and MPEG 4 standard, there are a total of 396 macroblocks (44× 36). In the present invention, there are a total of two 396×16 bits storage (register or SRAM) devices, one for the previous frame, the other one is for the current frame. This MV and prediction mode storage devices are implemented as a register array 71. A table 74 lists the selected prediction modes including: Skip block, same MV as FMV (no need for motion estimation), initial point of searching as FMV, same MV as left macroblock, same MV as upper macroblock, initial point of searching as FMV, the same MV as initial point of searching as in the previous frame, the same MV as initial point of searching as in the left macroblock, initial point of searching is same as upper macroblock, initial point of searching is "Prediction mode 1" of taking the average of MVs of the neighboring blocks, initial point of searching is "Prediction mode 2" of multiple points MAD comparing. Since the duration between two consecutive frames is short, the MV has high degree of similarity. A macroblock with the same MV as that in previous frame will have high probability of having the same MV in the next frame. Based on this concept, the initial point of searching of the next frame is very likely the same position of the previous MV. For example, if a block with the MV equals to the left block's MV of the previous frame, then, then initial point of searching in the next frame will be the position of the left block's MV. When the MV of a block is different from any of the predetermined MV of previous frame, then, the "Prediction mode 1" or "Prediction mode 2" can be applied. In present invention, the "Prediction mode 1" takes the average of the MVs of the "left block", "upper block" and "corresponding block" of current frame and previous frame as the initial point of searching. It is also appropriate to take the average of any two to six of the six positions as the initial point of searching. While the "Prediction mode 2" takes the position with lowest MAD of multiple points as the initial point of searching. The multiple points include position of the left block and the upper block of current frame, the left block, the upper block and the same positions of previous frame.

The present invention specifies the means of predicting the initial point of the motion estimation as the following. If the MV of the current macroblock is the same as FMV, then the predicted macroblock MV of the next frame is FMV. In case that the MV of macroblock starts to differ from FMV or to differ from neighboring macroblocks, then the initial point will adopt the MV with closest value in one of the following neighboring blocks: the left block or the upper block of the current frame, the left block, the upper block or the same position of the previous frame or the average of any combination of the above blocks of current and previous frame.

The present invention also specifies a threshold value, TH1 and another threshold value, TH2 to determine the adoption of the "Prediction Mode 1" and "Prediction mode 2". The MV of a macroblock within a previous frame different from any of the prediction modes as illustrated above is compared to the TH1 and TH2. If it is larger than TH2, then the "Prediction mode 2", a multiple point of MAD calculating and comparing is applied to identify the initial point of the searching. While, if it is less than TH2 but larger than TH1, then the "Prediction mode 1", averaging of the neighboring blocks and neighboring frame is applied to identify the initial point of the searching. Prediction mode 1 and prediction 2 benefit specifically the speedup of the motion estimation in video sequences with fast movement like the sporty program.

FIG. 8 illustrates the prediction mode of the present invention. 8A demonstrates the majority of macroblocks with the same MV like FMV, as seen in macroblock 80, 81. The targeted macroblock 811 just takes the FMV as its MV and needs no motion estimation since this block is within a group of block. In case of a block close to or in the edge of block with different MV from FMV, the block adopts the FMV as the initial point of searching. 8B shows the targeted macroblock 83 follows MV of the left macroblock 82 as the initial point of the motion estimation since there are two consecutive blocks in the left have the same MV. While in 8C, the targeted macroblock 85 is following MV of the upper macroblock 84 as the initial point of the motion estimation since there are two consecutive blocks on the top have the same MV. The macroblock 86 with dashed line in 8D is the targeted macroblock's 87 initial point of searching which is the corresponding macroblock in previous frame. 8E depicts two cases. One is taking the average of combinational MVs of left 88, upper macroblock 89 and the corresponding positioned macroblock 890 of previous frame (as shown in dashed lines) and left or upper of present frame to be the initial point of searching. Another case is the "Prediction mode 2" which takes multiple points of MAD calculation and comparison, the position of least MAD becomes the initial point of searching.

The present invention is implemented in a device such as a motion estimation system and module of a digital video encoder that concurrently implements any of the above methods of the invention in any combination thereof. FIG. 6 depicts the video compression system with the present invention of the efficient motion estimation. Since the motion compensation coding is macroblock based, in the case of a P-frame, B-frame, a P-type, or a B-type macroblock motion compensation coding, the macro block pixels are sent to the motion estimator 62 to be compared with pixels within macroblock of previous frame (and next frame in B-type case) as stored in the reference frame buffer 621 for the searching of the best match macroblock. The Predictor 60 calculates the pixel differences between the targeted 8×8 block and the corresponding best match macroblock of the previous frame (and next frame in B-type case). The 8×8 block difference is then fed into the DCT 61, quantizer 64, and eventually the VLC encoder 66. The later three steps are similar to the I-frame or I-type macroblock coding. In the present invention, the motion estimator searches for the best match macroblock by calculating the MAD and comparing some adaptively determined threshold values saved in the storage devices. The motion estimator will firstly calculate the frame motion vector, FMV by sub-sampling means, and save it to the FMV storage device in 63. The MV of all macroblocks within a previous frame and a partial or an entire frame of current frame will then be saved into the MV storage in 63. The MVs saving the movement displacement of previous frame and current frame are used to identify the initial point of next frame. The default or starting of the sub-sampling ratio of applying the sub-sampling means is set to be 2:1. In this invention, there are three other options of 4:1, 8:1 and 16:1. In the case of higher MV values of previous frame, the neighboring blocks are very likely to have larger movement and potential larger change of pixels content between frames, hence the sub-sampling ratio is set to lower ratio said 2:1 or 1:1. If the MV value of previous frame or neighboring block is small, a higher sub-sampling ration, said 4:1 or 8:1 ration, is applied to the motion estimation. The motion estimator 62 also checks the adaptively predetermined threshold values 67 of every macroblock to decide whether a refiner resolution, said ½ or ¼ pixel, is needed. The refiner pixel resolution is needed only in blocks having MV not the same as the FMV and the MV is larger than a predetermined value. If a refiner resolution is needed, the motion estimation constructs the 16×16 macroblock pixels by interpolation means with adjacent pixels for the use of the best match searching. The sub-sampling ratio control 67 adaptively determines the sub-sampling ratio for each macroblock of frame motion estimation. When the motion estimator obtains the MAD with a value lower than an adaptively set threshold value, the "Skip Block" flag will be set for motion compensation coding, and the block will contain no DCT data. In the region of blocks having higher MV values, the threshold of checking MAD and setting "Skip block" is set lower. During the MAD calculation by sub-sampling or non sub-sampling means, if a value of single pixel difference or the sum of the block difference is higher than an adaptively predetermined threshold values, the motion estimator 62 stops the rest of calculation and gives up the current macroblock and moves to the next candidate. Determination of the adaptive threshold values 67 and sub-sampling ratio setting is based on the movement and complexity of the targeted macroblock. In the case of fast movement with higher MV value and the threshold value of higher pixel resolution, the minimum value of MAD of the said "best match" will be set lower to ensure the accuracy of the motion estimation. After identifying the initial point, a full searching of the best match of calculating the MAD is done within the motion estimator 62. The data bus 691 helps in connecting function blocks and transferring data among the MV, FMV and prediction mode 63, threshold values and sub-sampling ratio control 67, the skip block, and other status register. Through the bus 691, Motion estimator is also connected to each of the three key function blocks 63, 67, and 69 for data transferring and accessing.

It will be apparent to those skills in the art that various modifications and variations can be made to the structure of the present invention without departing from the scope or the spirit of the invention. In the view of the foregoing, it is intended that the present invention covers modifications and variations of this invention provided fall within the scope of the following claims and their equivalents.

What is claimed is:

1. A method for motion estimation comprising:

saving motion vectors, MVs of a partial or an entire frame of at least one frame into a storage device for the best match macroblock searching of the current or the neighboring frames; and calculating the motion vector, MV, of a macroblock within a frame by firstly searching a corresponding or the neighboring macroblocks of the current or at least one neighboring frame, wherein estimating the MV of at least two macroblocks within a frame, and identifying the majority MV as the frame motion vector, FMV, and wherein the FMV is re-estimated when the number of macroblocks having different MV from the FMV reaches a predetermined value.

2. A method of motion estimation, comprising:

applying the adaptively predetermined values of the MV, the MAD or the block differences to determine the sub-sampling ratio, or to decide a refiner or a coarser pixel resolution, or to decide the prediction mode of the initial point of searching or to decide whether to skip block, or to decide whether to early select or to early give up the current macroblock, wherein the sub-sampled pixels are applied to the calculations of the MAD, MV, FMV or block differences for the motion estimation, and wherein a lower sub-sampling ratio is applied to the motion estimation of macroblocks with the edge or close to the edge of an object or macroblock with wider variance range of pixel values while the higher sub-sampling ratio is applied to the motion estimation of macroblocks with smaller MV or narrower variance range of pixel values.

3. A method of motion estimation, comprising:

applying the adaptively predetermined values of the MV, the MAD or the block differences to determine the sub-sampling ratio, or to decide a refiner or a coarser pixel resolution, or to decide the prediction mode of the initial point of searching or to decide whether to skip block, or to decide whether to early select or to early give up the current macroblock, wherein in the case of the MV or block differences of a macroblock of previous frame is larger than a predetermine threshold value, the MADs of at least two positions of the current frame or the neighboring frame are calculated, and the position with the least MAD is selected as the initial point of the best match macroblock searching.

* * * * *